United States Patent
Maestro Garcia et al.

(10) Patent No.: US 11,876,944 B2
(45) Date of Patent: Jan. 16, 2024

(54) NEUGEBAUER PRIMARIES HALFTONE LEVEL ADJUSTMENT

(71) Applicant: Hewlett-Packard Development Company, L.P., Spring, TX (US)

(72) Inventors: Javier Maestro Garcia, Sant Cugat del Valles (ES); Marti Rius Rossell, Sant Cugat del Valles (ES); Joan Vidal Fortia, Sant Cugat del Valles (ES); Peter Morovic, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/996,903

(22) PCT Filed: Apr. 24, 2020

(86) PCT No.: PCT/US2020/029853
§ 371 (c)(1),
(2) Date: Oct. 21, 2022

(87) PCT Pub. No.: WO2021/216088
PCT Pub. Date: Oct. 28, 2021

(65) Prior Publication Data
US 2023/0144915 A1 May 11, 2023

(51) Int. Cl.
*H04N 1/60* (2006.01)
*H04N 1/52* (2006.01)

(52) U.S. Cl.
CPC ............. *H04N 1/52* (2013.01); *H04N 1/6075* (2013.01)

(58) Field of Classification Search
CPC .................... H04N 1/52; H04N 1/60–6097
See application file for complete search history.

(56) References Cited

U.S. PATENT DOCUMENTS

| 5,483,625 | A | 1/1996 | Robertson et al. |
| 6,106,093 | A | 8/2000 | Nagoshi et al. |
| 6,267,476 | B1 | 7/2001 | Kato et al. |
| 6,789,870 | B2 | 9/2004 | Barnes et al. |
| 8,300,266 | B2 | 10/2012 | Yeh et al. |
| 10,893,173 | B2 * | 1/2021 | Morovic ............ H04N 1/00047 |
| 2005/0024410 | A1 | 2/2005 | Subirada et al. |
| 2007/0002343 | A1 | 1/2007 | Butterfield et al. |
| 2015/0158317 | A1 | 6/2015 | Simoni et al. |

FOREIGN PATENT DOCUMENTS

| GB | 2375681 A | 11/2002 | |
| WO | WO-2014117803 A1 * | 8/2014 | ............ G06K 9/4652 |

* cited by examiner

*Primary Examiner* — Barbara D Reinier

(57) ABSTRACT

Certain examples described herein relate to halftone level adjustment for Neugebauer Primaries (NPs). In certain examples, halftone levels for NPs are obtained for a halftone for printing an image. It is determined whether the halftone corresponds to a line or an area fill. The halftone levels may be adjusted in response to these levels exceeding a printing attribute threshold. The printing attribute threshold may be dependent on whether the halftone corresponds to a line or an area fill. The image may then be printed using the adjusted halftone levels.

15 Claims, 5 Drawing Sheets

NEUGEBAUER PRIMARIES HALFTONE LEVEL ADJUSTMENT

BACKGROUND

Color printing may result from a number of colorants of different colors being superimposed on top of a substrate, such as paper or other media. Since some printing technologies only allow for a very small number of levels of inks to be deposited at a given location on a substrate, half-toning may be used to obtain ink patterns that result in a given color when seen from a suitable viewing distance. These halftone patterns may also result in colorants being deposited on top of or next to one another in a specific manner, providing a color that relates nonlinearly to the amounts of the colorants (e.g., inks) used. Color control for the respective colorants may be increased due to Neugebauer's model of halftone color reproduction. Neugebauer's model may provide that the color of a halftone pattern is the convex combination of the colors of the Neugebauer primaries (NPs) used in the pattern. Thus, an NP is one of the possible ink overprints, with its convex weight being the relative area covered by it.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein.

DETAILED DESCRIPTION

Figure 1:
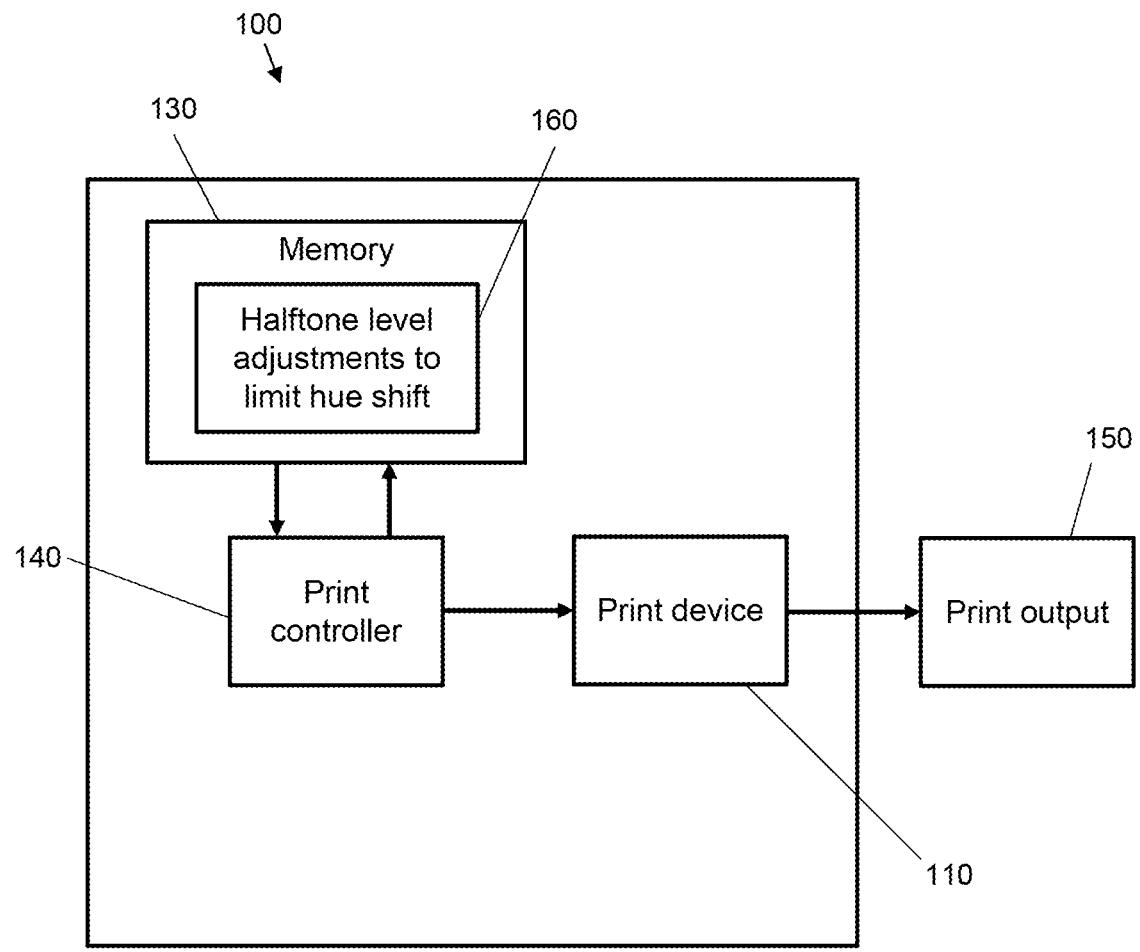
FIG. 1 is a schematic diagram of a printing system according to an example.

Certain examples described herein relate to adjusting halftone levels to mitigate issues relating to hue shift which may be seen in printed color images as changes in color over image features or areas which should have the same color. This may occur in bidirectional print modes where the rendered color may depend on the carriage direction due to a change in the falling order of different ink drops. This may also occur in high speed printing where aerodynamic effects cause the overlap of ink drops to change. Reducing the amount of ink drops fired can minimize hue shift however this is at the expense of color gamut and may also make certain image features such as lines more difficult to see. Also, hue shift may be less visible in areas fills and/or lines for some colorants than others.

A color space may be defined as a multi-dimensional space, with a point in the multi-dimensional space representing a color value and dimensions of the space representing variables within the color model. For example, in a Red, Green, Blue (RGB) color space, an additive color model defines three variables representing different quantities of red, green and blue light. In a digital model, values for these quantities may be defined with reference to a quantized set of values. For example, a color defined using an 8-bit RGB model may have three values stored in a memory, wherein each variable may be assigned a value between 0 and 255. Other color spaces include: a Cyan, Magenta, Yellow and Black (CMYK) color space, in which four variables are used in a subtractive color model to represent different quantities of colorant or printing fluid, e.g. for a printing system; the International Commission on Illumination (CIE) 1931 XYZ color space, in which three variables ('X', 'Y' and 'Z' or tristimulus values) are used to model a color; the CIE 1976 (L*, a*, b*—CIELAB or 'LAB') color space, in which three variables represent lightness ('L') and opposing color dimensions ('a' and 'b'); and the Yu'v' color space, in which three variables represent the luminance ('Y') and two chrominance dimensions (u' and v').

Other color spaces include area coverage spaces, such as the Neugebauer Primary area coverage (NPac) color space. An NPac vector in the NPac color space represents a statistical distribution of one or more Neugebauer Primaries (NPs) over an area of a halftone. An NP is a combination of colorants available to a printing device for reproducing colors that may have been received in a different color space and which have been mapped into the NPac color space. NPacs represent the linear convex combinations of NPs In a simple binary (bi-level, i.e. two drop states: "drop" or "no drop") printer, an NP may be one of $2^k-1$ combinations of k printing fluids within the printing system, or an absence of printing fluid (resulting in $2^k$ NPs in total). A colorant or printing fluid combination as described herein may be formed of one or multiple colorants or printing fluids such as ink. For example, if a bi-level printing device uses CMY printing fluids there can be eight NPs. These NPs relate to the following: C, M, Y, CM, CY, MY, CMY, and W (white or blank indicating an absence of printing fluid). An NP may comprise an overprint of two available printing fluids, such as a drop of magenta on a drop of cyan (for a bi-level printer) in a common addressable print area (e.g. a printable "pixel"). An NP may be referred to as a "pixel state".

In multi-level printers, e.g. where print heads are able to deposit N drop levels, an NP may include one of $N^k-1$ combinations of k printing fluids, or an absence of printing fluid (resulting in $N^k$ NPs in total). For example, if a multi-level printer uses CMY printing fluids with four different drop states ("no drop", "one drop", "two drops" or "three drops"), a total of 64 NPs, including for example C, CM, CMM, CMMM. The number of drops of colorant in an NP may be referred to as the halftone level and in examples this may be adjusted to avoid hue shift.

Each NPac vector defines the probability distribution for one or more colorant or printing fluid combinations (NP) for each pixel in a halftone (e.g. a likelihood that a particular colorant or printing fluid combination is to be placed at each pixel location in the halftone). In this manner, a given NPac vector defines a set of halftone parameters that can be used in the halftoning process to map a color to one or more NPac vectors to be statistically distributed over the plurality of pixels for a halftone. Moreover, the statistical distribution of NPs to pixels in the halftone serves to control the colorimetry and other print characteristics of the halftone.

Spatial distribution of NPs according to the probability distribution specified in the NPac vector may be performed using a halftone method. Examples of suitable halftoning methods include matrix-selector-based Parallel Random Area Weighted Area Coverage Selection (PARAWACS) techniques and techniques based on error diffusion. An example of a printing system that uses area coverage representations for halftone generation is a Halftone Area Neugebauer Separation (HANS) pipeline.

In an example, halftone level for NPs in NPacs may be reduced if they would otherwise result in noticeable hue shift. The halftone level at hue shift may be noticeable depends on whether the halftone belongs to a line or an area fill, and may also depend on the colorants in the NP. Therefore, different halftone level thresholds may be relevant depending on whether the halftone is for a line or an area fill, and the colorants involved. If a halftone level exceeds the appropriate threshold, it may be reduced to avoid hue shift. The amount of reduction in halftone level may also depend on whether the halftone is for a line or an area fill, and which colorant the halftone level corresponds to. For example, an NP comprising a CYYY colorant combination which has a Y halftone level of 1 and a Y halftone level of 3 may have the Y halftone level reduced to 2 resulting in a CYY color combination. The NPac with modified NP is sent to the halftoning process and the halftone is rendered by a print device without observable hue shift, for example depositing one drop of C and two drops of Y at one or more pixels of the halftone (depending on the value of the NPac vector for this NP).

A Halftone Area Neugebauer Separation (HANS) pipeline may be employed to implement this approach which allows the halftone levels of NPs to be individually controlled. This allows mitigation strategies for hue shift effects to be tailored to image features such as lines or area fills as well as individual colorants or NPs. Therefore, ink quantity may be controlled separately for different colorants at the halftone level for any RGB color and intensity input. In examples this may be implemented simply in a HANS pipeline using a lookup table (LUT) to adjust halftone levels as needed. This also accommodates multi-level printers where the NPs may correspond to multiple drops of one or more colorants so that even with more ink drop combinations, hue shift artifacts may still be mitigated.

FIG. 1 shows a printing system 100 according to an example. Certain examples described herein may be implemented within the context of this printing system.

The printing system 100 may be a 2D printing system such as an inkjet or digital offset printer, or a 3D printing system, otherwise known as an additive manufacturing system. In the example of FIG. 1, the printing system 100 comprises a printing device 110, a memory 130, and a print controller 140. The print controller 140 may be implemented using machine readable instructions and/or suitably programmed or configured hardware.

The printing device 110 may be an inkjet deposition mechanism such as a printhead and is arranged to deposit colorants such as inks onto a print substrate to produce a print output 150. The print output 150 may, for example, comprise colored printing fluids deposited on a substrate to render an image. In 2D printing systems, the substrate may be paper, fabric, plastic or any other suitable print medium.

In 3D printing systems, the print output 150 may be a 3D printed object. In such systems, the substrate may be a build material in the form of a powder bed comprising, for example, plastic, metallic, or ceramic particles. Chemical agents, referred to herein as "printing agents", may be selectively deposited onto a layer of build material. In one case, the printing agents may comprise a fusing agent and a detailing agent. In this case, the fusing agent is selectively applied to a layer in areas where particles of the build material are to fuse together, and the detailing agent is selectively applied where the fusing action is to be reduced or amplified. In some examples, colorants may be deposited on a white or blank powder to color the powder. In other examples, objects may be constructed from layers of fused colored powder. In these cases, calibration areas may comprise areas formed from or within one or more layers of fused material The memory 130 comprises halftone level adjustments for halftones which depend on what type of image feature the halftone corresponds to. For example, the adjustment may be greater for area fills than lines. An area fill is a region of an image having the same color and contrasts with a line which generally has a much smaller width and in which effects such as hue shift are less visible to a human observer. The adjustments may also depend on the halftone level itself, for example a high halftone level may require a larger reduction than a smaller halftone level. In some examples, the memory may comprise a lookup table (LUT) mapping received halftone levels to reduced halftone levels depending on whether the halftone corresponds to a line or an area fill, and/or depending on the received halftone level itself.

Figure 2:
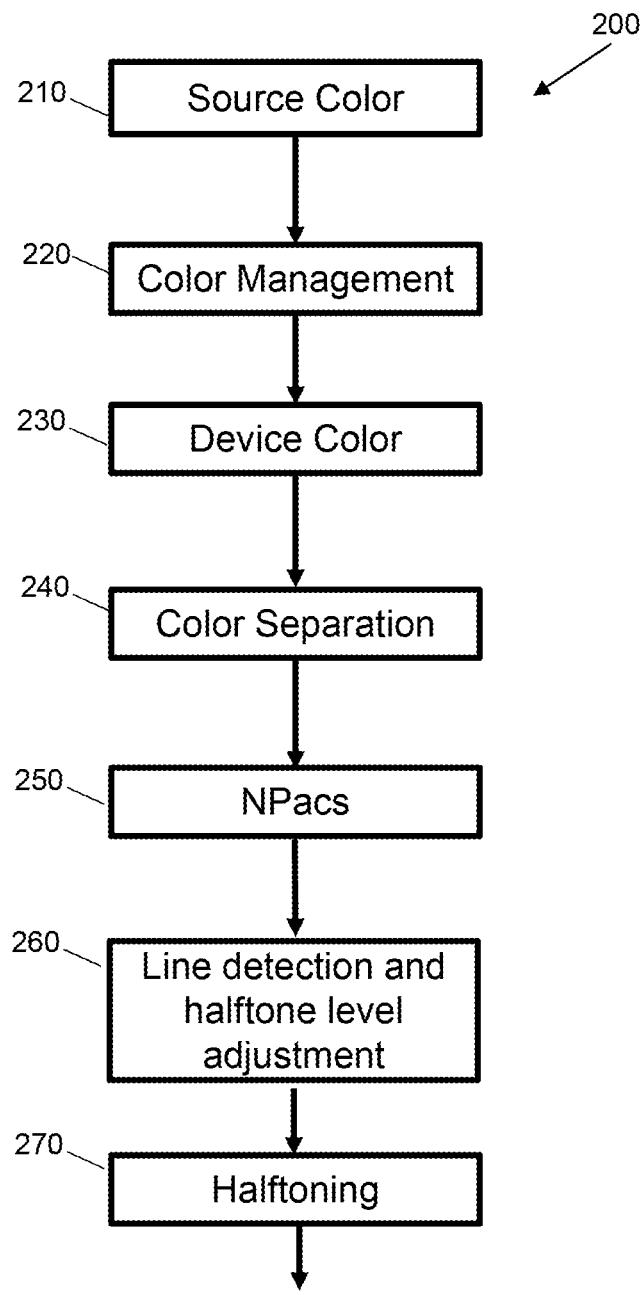
FIG. 2 is a schematic diagram of a modified HANS pipeline according to an example.

The print controller 140 may include a HANS pipeline arranged to reduce obtained halftone levels using the halftone level adjustments 160 in the memory 130. An example HANS pipeline is illustrated in FIG. 2 and includes a color management stage 220 (e.g. color manager logic operated by a processor) that receives source color data 210 and generates a device color output 230 (e.g. specification of red, green, blue). The device color output 230 can be processed by a color separation stage 240 that maps input from the device color output to an NPac vector, for example using an NPac lookup table (LUT). An NPac vector defines the probability distribution for each NP of a printing system for each pixel within a halftone. For example in a bi-level printing system the NPac vector [W 1/9; C 1/9; M 2/9; Y 0/9; CM 2/9; CY 1/9; MY 1/9; CMY 1/9] in a halftone having 3×3 pixels (i.e. 9 pixels), the resulting print output would have a halftone with one pixel of White (W); one pixel of Cyan (C); two pixels of Magenta (M); no pixels of Yellow (Y); two pixels of Cyan+Magenta (CM); one pixel of Cyan+Yellow (CY); one pixel of Magenta+Yellow (MY); and one pixel of Cyan+Magenta+Yellow (CMY).

Generally, the print output of a given area is generated such that the probability distributions set by the NPac vectors of each pixel are fulfilled. For example, the NPac vector may be effected by a halftone stage 270 that implements the spatial distribution of colorant combinations defined by the vector, e.g. via a series of geometric shapes such as dots of predetermined sizes being arranged at predetermined angles. As such, an NPac vector is representative of the colorant overprint statistics of a given area. Although a CMY system is used for ease of explanation, other imaging systems may be used.

The halftone levels for each colorant in a colorant combination in an NP may correspond to the number of drops of ink for that colorant. For example for a CYY NP, the halftone level for C is 1 and for Y is 2, corresponding to 1 drop of C and 2 drops of Y being deposited at one or more halftone pixels according to the coverage of that NP defined in the NPac. For example, where the CYY NP has a coverage of 25%, the above combination of inks may be deposited in one pixel of a 2×2 pixel halftone.

The HANS pipeline 200 also comprises a line detection and halftone level adjustment stage 260. A line detection algorithm may be employed to determined whether a corresponds to a line, and if it doesn't it is assumed to correspond to an area fill. Line detection algorithms are well known to those skilled in the art and any suitable algorithm may be employed, for example using convolution of the image with a mask that matches a pattern of interest. In this case a line thicker than one pixel.

The halftone level for each colorant may then be adjusted depending on whether the halftone corresponds to a line or area fill and/or based on the halftone level for that colorant. The modified NPac for that halftone may then be sent on to the halftoning process 270. In an example, adjustment of halftone levels may be implemented using a lookup table (LUT) as illustrated in FIG. 3.

Figure 3:
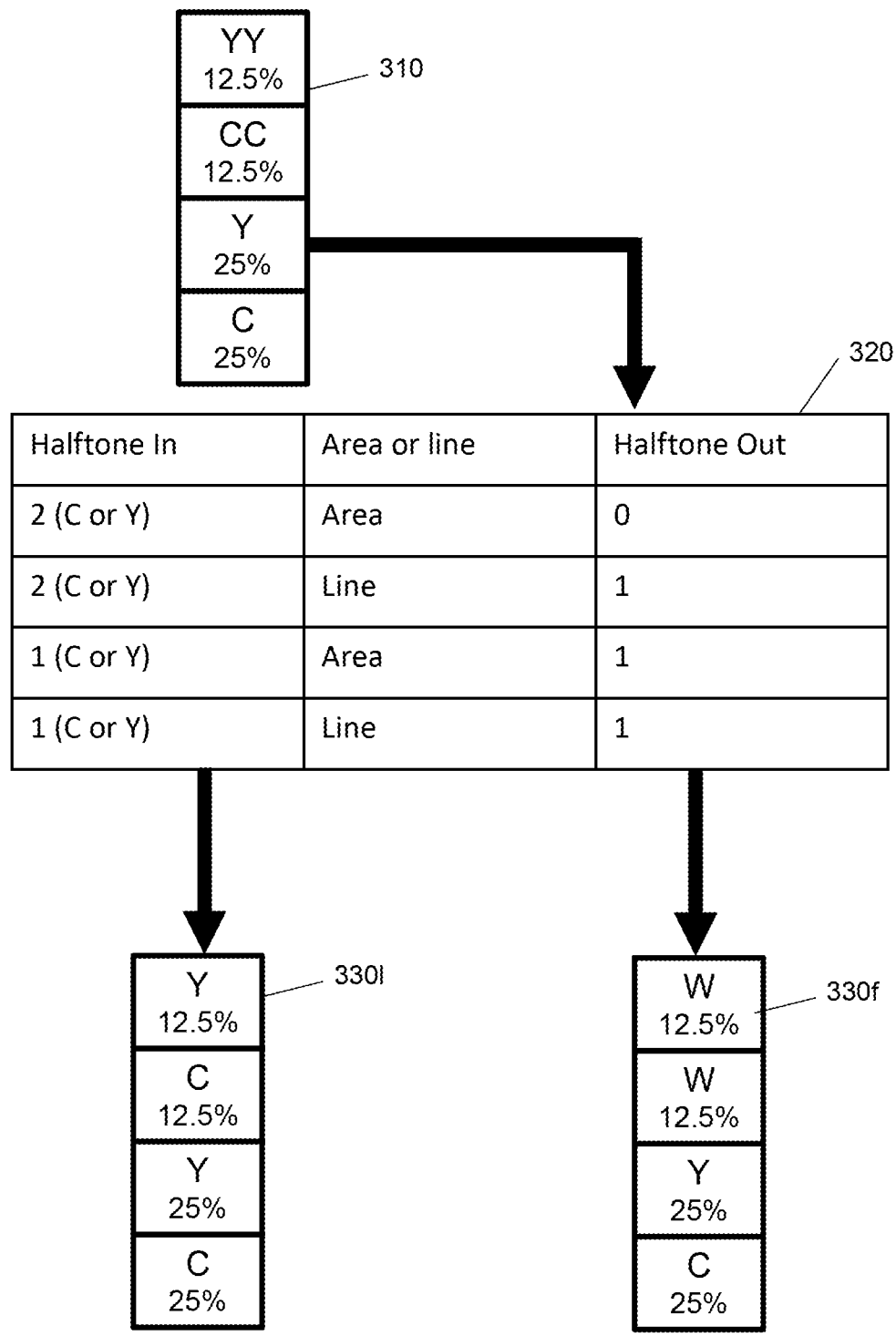
FIG. 3 is a schematic diagram illustrating adjustment of halftone levels according to an example.

FIG. 3 illustrates how the halftone levels for different colorants in a NP may be adjusted or reduced. An NPac vector 310 is shown having 25% coverage for Cyan (C), 25% coverage for Yellow (Y), 12.5% coverage for CC and 12.5% coverage for YY. The remaining coverage may be assumed to be White (W). In this example C corresponds to one drop of cyan ink and CC corresponds to two drops of cyan ink. This corresponds to a halftone level of 1 for the C (or Y) component and 2 for the CC (or YY) component as shown in the LUT 320. The adjustments are shown for halftones corresponding to lines and area fills. The halftone level, colorant level or number of ink drops for C or Y are not affected for either lines or area fills, however the halftone level or number of ink drops for CC or YY are reduced in both cases. In the case of a line these levels are reduced from 2 to 1 and in the case that the halftone corresponds to an area fill these halftone levels are reduced from 2 to 0. The coverage for each colorant may be adjusted depending on the other colorants in the NP, for example the percentages or coverages of Y and YY may be adjusted depending on the presence of C and M in the received NPac As can be seen the halftone levels of the NPac for a line 330l and an area fill 330f both have reduced values compared to the received NPac 310, with the modified NPac for the line 330l having two Y and two C each with a halftone level of 1 and the modified NP for the area fill 330r having one Y and one C each with a halftone level of 1 and two W (white or null) components. The adjusted NPac's 330l and 330f are shown with two NPs to illustrate how the adjustment to halftone levels is made but in practice the NPac will include a single coverage percentage for each NP. So for the adjusted NPac for a line 330l, this will include Y 37.5% and C 37.5%, and for the adjusted NPac for an area fill 330f, this will include Y 25%, C 25% and W 25%.

The reduction in colorant levels or drops reduces hue shift which might otherwise be observed in the printed output. The reductions are greater for halftones corresponding to area fills as hue shift is more noticeable for these image features than for lines. In other words, the colorant level over which hue shift becomes visible or the hue shift threshold, is lower for area fills than for lines and therefore halftone levels for area fills may be subject to greater reductions than lines. Similarly different colorants may have different hue shift thresholds.

Figure 4:
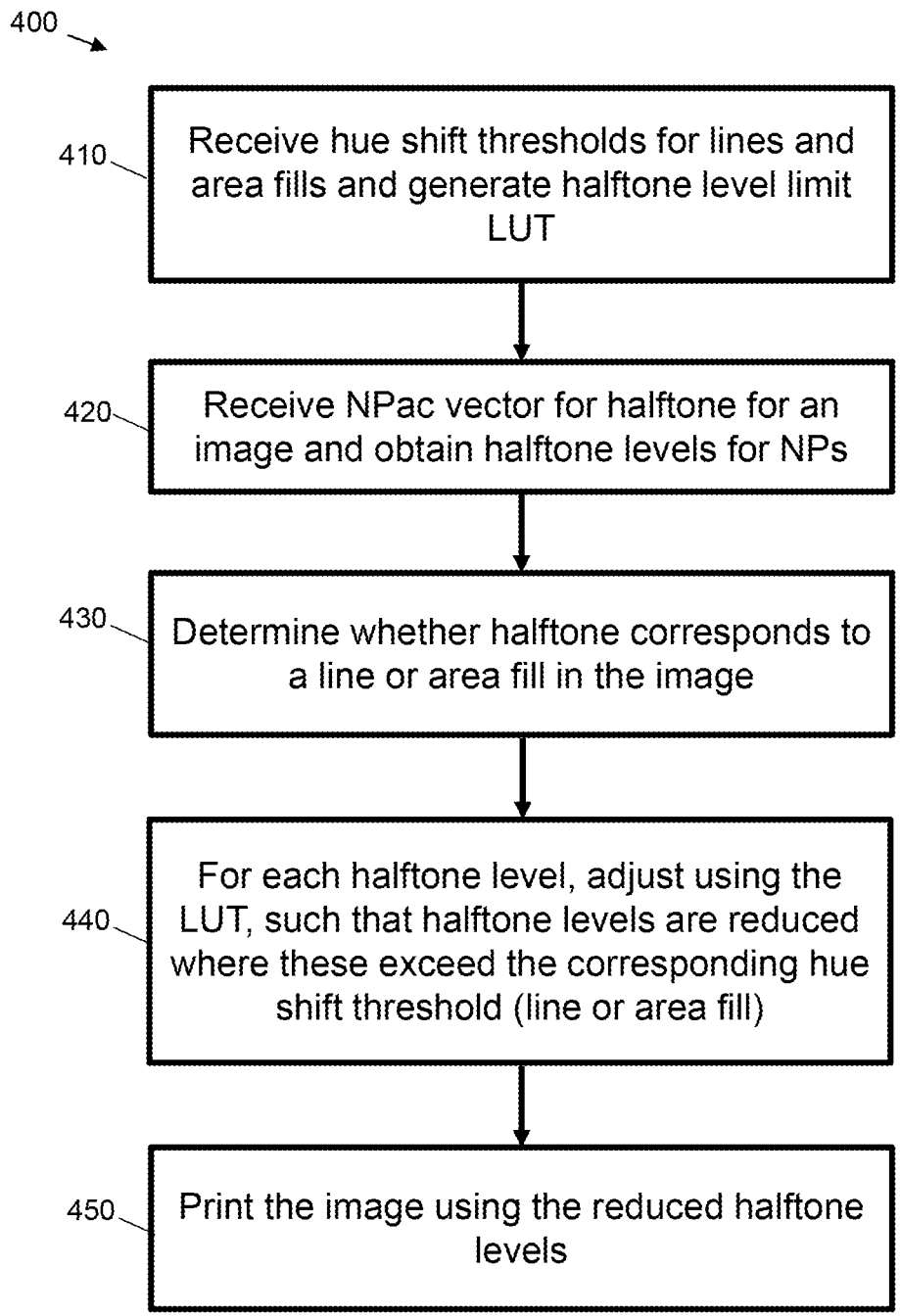
FIG. 4 is a flow chart illustrating a method for adjusting halftone levels according to an example.

FIG. 4 shows a method 400 of adjusting halftone levels in a printing system according to an example. In some examples, the method 400 is performed by a print controller such as print controller 140 which may implement a HANS pipeline. The print controller may perform the method based on instructions retrieved from a computer-readable storage medium. The printing system may comprise printing system 100.

At item 410, hue shift thresholds for lines and area fills for different colorants used by the printing system are received. These may be determined experimentally and may be downloaded from a remote location, for example using a firmware update. The thresholds correspond to halftone levels for different colorants for lines or areas fills and may be provided as a look up table (LUT) for use by a HANS pipeline. This item may be performed once or may be performed again when updates to the thresholds or LUT become available.

At item 420, an NPac vector is obtained for a halftone for an image to be printed. The NPac vector contains coverage data for a number of NPs. The NPs include halftone levels of colorants for that NP.

At item 430, it is determined whether the halftone corresponding to the NPac is part of a line or an area fill. This may be implemented by a suitable line detection algorithm.

At item 440, the halftone levels of the NPs of the received NPac may be adjusted. For each NP the halftone levels for colorants are determined and compared with a hue shift threshold. The hue shift threshold used depends on whether the halftone is for a line or an area fill, and may also depend on the colorant. If the halftone level for the NP exceeds the threshold it is reduced or adjusted using a LUT. For example, as noted above in FIG. 3, a NP having a Y (Yellow) colorant with a halftone level of 2 has its halftone level for Y reduced to 0 for area fills and 1 for lines.

At item 450, the image is printed using the adjusted halftone levels. In an example, modified NPacs (having NP with reduced halftone levels for one or more colorants) are sent to a halftoning process such as PARAWACS to generate modified halftones for printing by a printing device. The reduced halftone levels may reduce the number of ink drops deposited in respective halftone pixels on the substrate, thereby avoiding observable hue shift within the printed image.

Figure 5:
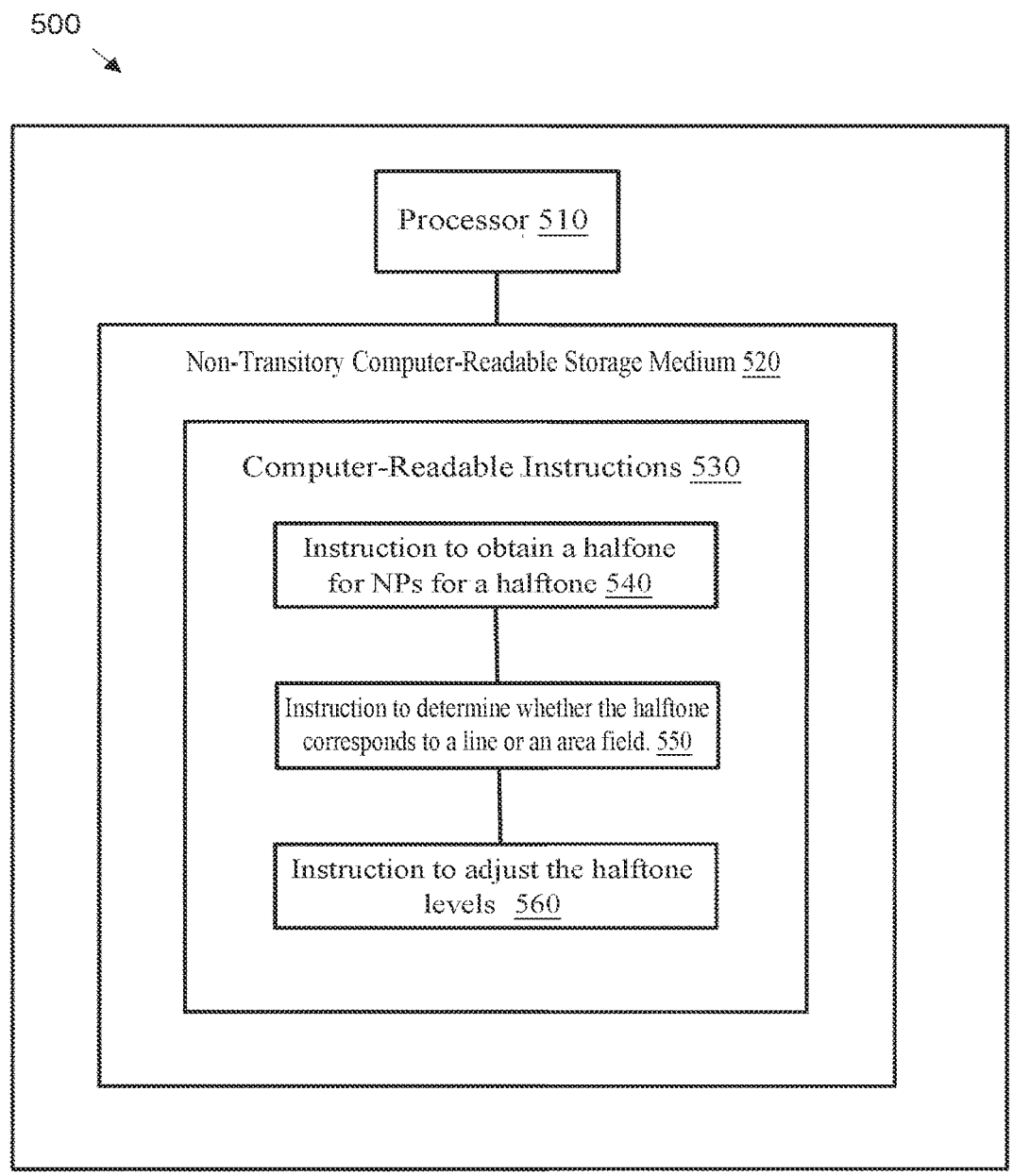
FIG. 5 is a schematic diagram of a processor and a computer readable storage medium with instructions stored thereon according to an example.

FIG. 5 shows example components of a printing system 500, which may be arranged to implement certain examples described herein. A processor 510 of the printing system 500 is connectably coupled to a computer-readable storage medium 520 comprising a set of computer-readable instructions 530 stored thereon, which may be executed by the processor 510. The printing system 500 may comprise a printing system similar to printing system 100.

Instruction 540 instructs the processor 510 to obtain a halftone level for NPs for a halftone. The halftone level may be received for example from an NPac for a halftone for printing an image. The NPs may comprise multiple halftone levels corresponding to respective colorants. The halftone levels may be selected from zero and a plurality of non-zero colorant levels, for example number of drops of a corresponding ink.

Instruction 550 instructs the processor 510 to determine whether the halftone corresponds to a line or an area fill. This may be implemented using a line detection algorithm.

Instruction 560 instructs the processor to adjust the halftone level depending on whether this exceeds a printing attribute threshold wherein the printing attribute threshold is dependent on whether the halftone corresponds to a line or an area fill. The printing attribute threshold may be a hue shift threshold and/or may also depend on the colorant to which the halftone level corresponds. This may result in a modified NPac, having one or more NPs with reduced halftone levels.

Processor 510 can include a microprocessor, microcontroller, processor module or subsystem, programmable integrated circuit, programmable gate array, or another control or computing device. The computer-readable storage medium 520 can be implemented as one or multiple computer-readable storage media. The computer-readable storage medium 520 includes different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. The computer-readable instructions 530 can be stored on one computer-readable storage medium, or alternatively, can be stored on multiple computer-readable storage media. The computer-readable storage medium 520 or media can be located either in the printing system 500 or located at a remote site from which computer-readable instructions can be downloaded over a network for execution by the processor 510.

Certain examples described herein enable a reduction in visible hue shift artefacts by reducing halftone levels at the NPac or halftone level. The reduction in halftone levels may be dependent on whether the corresponding halftone is part of a line or an area fill. It may also be depending on the colorant to which the halftone level corresponds. The reduction in halftone level may also be dependent on the direction of printing. For example, in a bidirectional printing device using bidirectional passes, halftone levels may be adjusted (or remain unmodified) depending on the direction of the pass in which the correspond halftones are printed. The level of adjustment may also be dependent on the speed of the passes and/or other characteristics of the printing devices.

The examples allow high speed print modes to handle both lines and area fills requiring high amounts of ink to avoid hue shift which may be caused by aerodynamic effects which are exaggerated at high ink quantities. By applying the halftone levels adjustments in the NPac structure, this solution can be applied to any RGB input colors and with any intensity. This means that nothing is sacrificed in terms of color reproduction for image parts which don't require adjustment, in other words any corrections required are only applied to those halftones which might otherwise be subject to hue shift effects. This means the solution can be applied smoothly and avoid artefacts that might occur using different solutions which might be based on specific colors or for all image features such as all area fills.

In other examples, halftone levels may be reduced or increased depending on whether these exceed other types of printing attribute thresholds and whether the halftone corresponds to a line or an area fill. Examples of printing attribute thresholds other than hue shift thresholds include an area fill ink limit, a printing defect threshold or a colorant threshold. The area fill ink limit may only apply to halftones belonging to an area fill (i.e. it does not affect halftone levels for halftones belonging to lines) and may limit the number of drops of specific colorant that can be used in an area fill. These limits may be applied in the same way as hue shift thresholds described above, for example using a HANS pipeline lookup table that only acts on received NPacs for halftones belonging to area fills whilst ignoring those belonging to lines.

Other types of limits may be applied to the amount of ink that can be applied depending on whether the halftone belongs to an area fill or a line. These printing defect thresholds may be used to prevent other printing artefacts that may occur dependent on the amount of ink applied. For example in some applications it may be desirable to reduce ink in area fills to improve drying time. It may also be desirable to limit ink depending on the printing substrate used as some papers may wrinkle if they become too wet. Another reason to avoid high sustained ink drop firing rates is that this may cause the printheads to heat up which in turn may lead to printing defects. Such high rates may be acceptable in short bursts, for example in lines, but not in larger area fills. Therefore ink or halftone level may also be controlled based on these sorts of factors.

In other examples, the halftone levels may be increased rather than reduced, for example to increase the visibility of lines by increasing the amount of ink for some colorants. This may be possible for some colorants without increasing hue shift or other potential print defects. The above described example implementations may be modified to achieve this effect, such as modified the LUT of FIG. 3 to increase some halftone levels for lines but either leave them unchanged or reduce them for area fills—this may be dependent on colorant. For example, where the halftone level for C or Y is 1 for a line, this may be increased to 2. Alternatively or additionally, where the halftone level for lines is 2 for C this may be increased to 3, whereas where the halftone level for lines is 2 for Y this may be unchanged or even reduced.

As can be seen, the examples allow the halftone levels for individual colorants to be manipulated at the halftone level depending on whether the halftone belongs to a line or area fill. This allows printing of these features to be corrected for one or a number of defects or even enhanced to aid visibility of the feature. For example effects such as hue shift may be corrected for more precisely and finely than is possible with other approaches, whilst also allowing improvements in line visibility by enhancing color saturation for some colorants but not others. In other words, the examples allow the amount of ink fired to be optimized depending on whether this is for a line or an area fill. Therefore a "one size fits all" approach to correcting printing defects can be avoided as the adjustments to halftone level are made for each halftone depending on halftone level for each colorant and the type of image feature to which the halftone belongs.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method comprising:
obtaining halftone levels for Neugebauer Primaries (NP) for a halftone for printing an image;
determining whether the halftone corresponds to a line or an area fill;
adjusting the halftone levels depending on whether this exceeds a printing attribute threshold wherein the printing attribute threshold is dependent on whether the halftone corresponds to the line or the area fill;
printing the image using the adjusted halftone levels.

2. The method according to claim 1, wherein the printing attribute threshold is one of the following: a hue shift threshold; an area fill ink limit; a printing defect threshold; a colorant saturation threshold.

3. The method according to claim 1, wherein the halftone levels are selected from zero and a plurality of non-zero colorant levels.

4. The method of claim 3, wherein the adjustment of the halftone levels is dependent on the plurality of non-zero colorant levels.

5. The method of claim 3, wherein the plurality of non-zero colorant levels corresponds to one of a plurality of drops of a colorant and the printing attribute threshold is a respective hue shift threshold for the line and area fill and corresponds to maximum respective numbers of drops of the colorant.

6. The method of claim 1, wherein the halftone levels are obtained in a Halftone Area Neugebauer Separation (HANS) pipeline using a received Neugebauer Primary area coverage (NPac) vector.

7. The method of claim 1, wherein printing the image uses bidirectional passes and wherein the adjusted halftone levels depend on the direction of the pass in which said halftone is printed.

8. The method of claim 1, wherein determining whether the halftone corresponds to the line or the area fill uses a line detection algorithm.

9. A printing apparatus comprising:
- a print device to print an image onto a substrate;
- a memory having adjustments for received halftone levels for Neugebauer Primaries (NPs) for a halftone depending on whether the halftone corresponds to a line or an area fill and a corresponding printing attribute threshold;
- a processor to:
  - receive the halftone levels for Neugebauer Primaries (NPs for a halftone for printing an image;
  - determine whether the halftone corresponds to the line or the area fill;
  - adjust the halftone levels using the adjustments in response to determining that the received halftone levels exceeds the corresponding printing attribute threshold;
  - cause the print device to print the image using the adjusted halftone levels for the halftone.

10. The printing apparatus of claim 9, wherein the corresponding printing attribute threshold is one or more of the following: a hue shift threshold; a printing defect threshold; an area fill ink limit; a colorant saturation threshold.

11. The printing apparatus of claim 9, wherein the halftone levels are selected from zero and a plurality of non-zero colorant levels.

12. The printing apparatus of claim 10, wherein the adjustments for the received halftone levels depend on a colorant level.

13. The printing apparatus of claim 12, wherein the colorant level corresponds to one of a plurality of drops of a colorant and the hue shift threshold for the line and area fill correspond to maximum respective numbers of drops of the colorant, and wherein the hue shift threshold for the area fill is lower than the hue shift threshold for the line.

14. The printing apparatus of claim 9, the processor to implement a Halftone Area Neugebauer Separation (HANS) pipeline to obtain the halftone levels using Neugebauer Primary area coverage (NPac) vectors and adjust the halftone levels in the Halftone Area Neugebauer Separation (HANS) pipeline using a lookup table (LUT).

15. A non-transitory computer-readable storage medium comprising a set of computer-readable instructions that, when executed on a processor, cause the processor to:
- obtain a halftone levels for Neugebauer Primaries (NPs) for a halftone;
- determine whether the halftone corresponds to a line or an area fill;
- adjust the halftone levels depending on whether this exceeds a printing attribute threshold wherein the printing attribute threshold is dependent on whether the halftone corresponds to the line or the area fill.

* * * * *